US006313825B1

(12) United States Patent
Gilbert

(10) Patent No.: US 6,313,825 B1
(45) Date of Patent: Nov. 6, 2001

(54) VIRTUAL INPUT DEVICE

(75) Inventor: Timothy G. Gilbert, Vermillion, SD (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/221,043

(22) Filed: Dec. 28, 1998

(51) Int. Cl.[7] ................ G09G 5/00; G09G 5/08
(52) U.S. Cl. ............ 345/156; 345/157; 345/158; 345/160
(58) Field of Search .................. 345/156–158, 345/160, 163

(56) References Cited

U.S. PATENT DOCUMENTS

| | | | |
|---|---|---|---|
| 4,682,159 | 7/1987 | Davison | 340/709 |
| 4,692,756 | 9/1987 | Clark | 340/709 |
| 4,772,764 | 9/1988 | Dorr | 178/18 |
| 4,814,552 | 3/1989 | Stefik et al. | 178/18 |
| 4,988,981 | 1/1991 | Zimmerman et al. | 340/709 |
| 5,059,959 | 10/1991 | Barry | 340/709 |
| 5,144,594 | 9/1992 | Gilchrist | 367/129 |
| 5,239,139 | 8/1993 | Zuta | 178/18 |
| 5,369,270 | * 11/1994 | Gurner et al. | 345/167 |
| 5,638,092 | * 6/1997 | Eng et al. | 345/158 |
| 5,789,739 | 8/1998 | Schwarz | 250/221 |
| 5,821,922 | 10/1998 | Sellers | 345/157 |
| 5,959,612 | * 9/1999 | Breyers et al. | 345/157 |
| 6,035,350 | * 3/2000 | Swamy | 710/73 |
| 6,037,882 | * 3/2000 | Levy | 345/168 |
| 6,130,663 | * 10/2000 | Null | 345/163 |

FOREIGN PATENT DOCUMENTS

95/22097   2/1995   (WO) ............ G06F/3/00

OTHER PUBLICATIONS

"Ultrasonic Cursor Position Detection", *IBM Technical Digest*, vol. 27, No. 11, 6712–6714, (Apr. 1985).

* cited by examiner

Primary Examiner—Richard Hjerpe
Assistant Examiner—Duc Q Dinh
(74) Attorney, Agent, or Firm—Kenneth J. Cool; Lee Brennan; Schwegman, Lundberg, Woessner & Kluth

(57) ABSTRACT

An input device for a computer detects movement of an object, such as a finger, within a selected field of space, and across the boundaries of the selected space. The input device is used to input commands into a computer, such as to control movement of a cursor over a display device or to mark certain portions of information displayed on the computer monitor. Directional transducers receive reflections of transmitted energy from an object in the field, and provide signals to an interpreter which maps the signals to control movement of the cursor or other device on the computer monitor. The input device includes an interpreter for detecting movements within the selected input space. Certain or selected detected movements within or through the input space are interpreted as input commands for controlling aspects of the computer.

24 Claims, 10 Drawing Sheets

VIRTUAL INPUT DEVICE

FIELD OF THE INVENTION

The present invention is related to computer systems and computer devices for interfacing with the computer. In particular, the present invention is related to an interface for moving an on-screen pointer.

BACKGROUND OF THE INVENTION

Currently computers have several input devices or interfaces which operators use to initiate or terminate computing tasks, to interrogate the computer to determine the status of tasks during execution, or to give and receive instructions. One interface is a computer keyboard. The keyboard is a relatively slow input device. The keyboard includes a typing pad and a number pad that a human operator uses to input various data and commands. Another computer input device is a mouse. The mouse has the advantage of speed, convenience and control. The mouse typically includes a ball within a housing. The housing has a semispherical cavity. A ball fits within the semispherical cavity. In the wall of the cavity are several built-in motion detectors which detect the motion of the ball when it is rolled. The motion detectors are actually two rollers mounted at 90-degree angles with respect to each other, which ride on the surface of the ball. Attached at one end of each roller is a wheel, known as an encoder. The wheel has openings near the outer periphery. A light-emitting diode is on one side of the wheel and on optical pickup is on the other. As the ball moves, the roller-attached wheel turns and produces a flash of light at the optical pickup. Each time an optical pickup detects light, an electrical signal results. The number of signals produced indicates the number of openings on the encoder that have been passed. Typically, there are two rollers with encoders. One roller indicates vertical movement and the other roller indicates horizontal movement of the cursor. The direction in which the rollers are turning, combined with the ratio between the number of signals from the vertical and horizontal rollers, indicate the direction that the mouse is moving. The signals from the two encoders are transferred to a microprocessor. The microprocessor converts the signals to movement of a cursor on the computer screen. Side to side movement of the mouse converts to horizontal movement on the computer screen. Movement of the mouse toward and away from the computer converts to vertical movement on the computer screen.

The mouse also includes buttons. Most mouse input devices have two mouse buttons, although, some have only one and others have more. The buttons are mounted on the housing of the mouse so that they are easily clicked using the user's finger. By clicking one or more buttons atop the mouse, additional input signals are sent to the computer. A single tap to a right mouse button moves the blinking cursor to a selected point on the screen. Large areas of the screen can be marked by "clicking and dragging." In other words, by depressing a mouse button and moving the mouse over a surface, large areas can be marked.

Another input device is a trackball. A trackball is essentially a mouse in an upside-down orientation. The ball of a trackball is mounted so that the ball is rotated by the user's fingers instead of along a flat surface of the user's desk or along a mouse pad. Other input devices include joysticks and yokes. Joysticks and yokes are typically used for controlling game software.

Mouse devices and trackballs have shortcomings. First of all, they are electromechanical devices and require mechanical interaction between the ball and the roller in order to work. Mechanical devices are generally more prone to failure than an electrical device. Another problem is that a mouse or a trackball can get dirty over time. Dust and other material can collect in the spherical housing of the mouse or trackball which causes the roller to roll erratically or not to roll at all. Periodic cleaning is then required. Another problem is that mouse devices require desktop space. When using a smaller computer, such as a notebook or portable computer, many times desktop space is unavailable. One such place where desktop space is unavailable is on an airplane, train or bus. The mouse or trackball typically also has cabling which can be cumbersome in limited desktop space applications. Some input devices now communicate via infrared or radio signal to eliminate the cumbersome cables.

In notebooks and portables, trackballs have been incorporated into the keyboard to lessen the need for desk space. Trackballs add space to the keyboard of a notebook or portable computer. It is desirable to make notebook computers as small as possible and adding a trackball limits the amount of reduction that can be accomplished. The trackballs still are mechanical and prone to mechanical failure as well as getting dirty. Touch pads are also now being incorporated into the keyboard. These also limit how small the notebook can be made. Small, short joysticks have also been used to move a cursor. Small short joysticks, touch pads and trackballs all require separate buttons for inputting additional signals to the computer. Most of these input devices also have some mechanical portion which may be prone to failure. The small, short joysticks, touch pads and trackballs also require movement which is not the same as the movements associated with using a mouse; therefore a user familiar with a mouse must learn new movements in order to use these input devices.

U.S. Pat. No. 5,059,959 includes a cursor-aiming system for use with a screen having a movable cursor. A field is generated and the cursor on the screen moves in response to the movement of an operator's finger within the field. This patent eliminates some of the mechanical components but still has a number of shortcomings. The field, as shown in the patent, is not positioned beside the keyboard where a mouse pointing device would normally be. In addition, the field is not positioned over the keys of the keyboard where a short pointing device or a built in track ball would normally be used. As a result, an operator could not just merely use finger motions within the same volume where finger motions for a previous input device were used. The field in U.S. Pat. No. 5,059,959 is positioned over the front of the keyboard and appears to be positioned in front of the screen in a computer system. As a result, the operator repositions ". . . a cursor on a screen on a computer terminal display by lifting a forefinger from the keyboard and moving the finger in the desired direction of cursor movement." (Column 5, lines 26–29 of U.S. Pat. No. 5,059,959). U.S. Pat. No. 5,059,959 seems to be a touchless screen input device where the field remains essentially in one volume. U.S. Pat. No. 5,059,959 is limited to moving the cursor and does not teach other motions which could be interpreted as other inputs. As a result, the operator must relearn a new set of finger motions or, more than likely, go back to keyboard commands or use an additional input device to input information into the computer. An additional drawback is that two hands must be used to input commands into the computer using the device taught in U.S. Pat. No. 5,059,959. To prevent unintentional hand or finger motions from affecting the cursor, ". . . the apparatus is normally deactivated and the operator must enable it when desired by holding down a control key with one hand while gesturing with the other." (Column 5, lines 30–34 of U.S. Pat. No. 5,059,959).

SUMMARY OF THE INVENTION

An input device for a computer detects movement of an object, such as a finger, within a selected field of space. The input device is used to control movement of a cursor over a display device. Directional transducers receive reflections of transmitted Electromotive Force ("EMF") from an object in the field, and provide signals to an interpreter which maps the signals to control movement of the cursor or other device on the computer monitor. The interpreter detects movements within the selected field and provides signals to control the cursor. The interpreter includes a clock which determines the time difference between reflections from a first directional transducer and a second directional transducer to determine position of a stylus or finger. The directional transducer can limit many types of electromagnetic energy including infrared or ultrasonic energy. The selected field, preferably, is placed adjacent the keyboard so that a person used to a mouse input device can easily employ this invention. This is especially helpful since many users have another computer system that they use. The field can be positioned and movements selected so that this invention replicates another type of input device. For example, the field can be placed over the keyboard so that users which currently use input devices built into computer keyboards can redefine the space and have certain other motions for inputting information to a computer. For example, breaking the plane of a defined volume two times could be interpreted as a "double click" on a mouse. In addition, one hand can be used with the field to input data into the computer.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
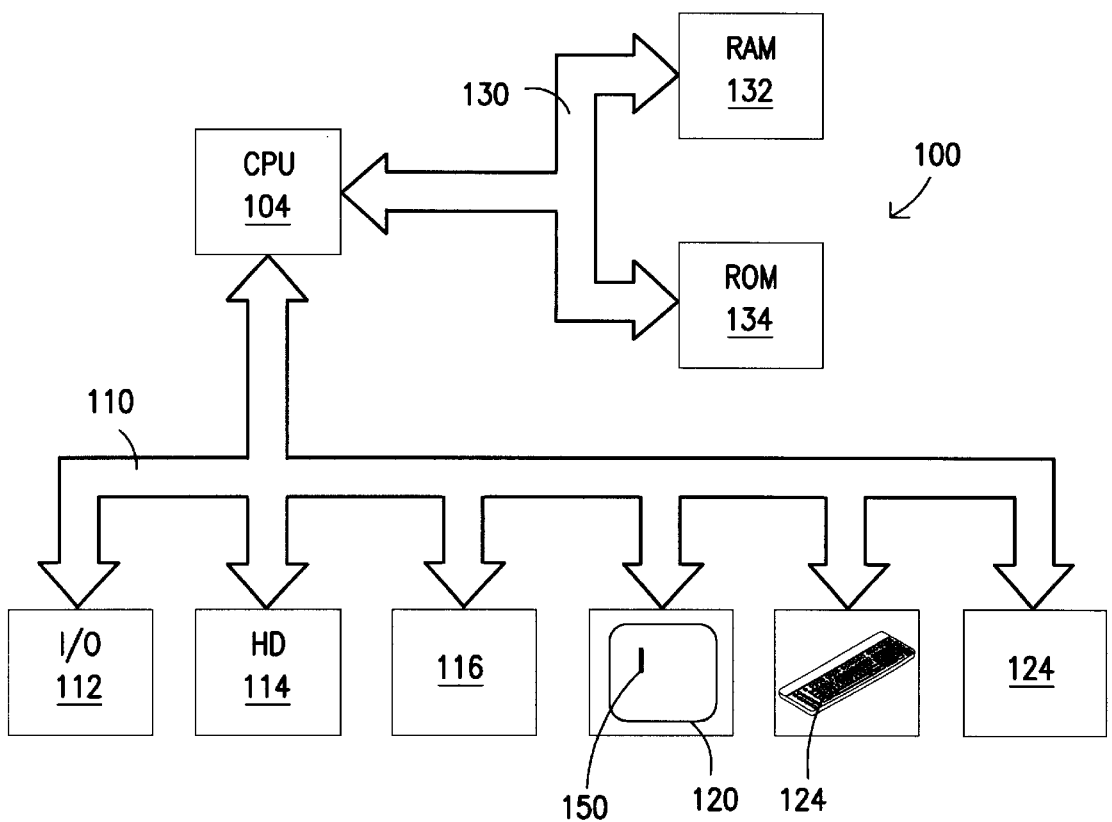
FIG. 1 is a schematic diagram of a computer with a cursor controlling device.

FIG. 1 shows a computer system 100. A computer system 100 comprises a system bus 110, and a memory bus 130 coupled to a central processing unit 104. Attached to the system bus 110 is an input/output controller 112, a hard disk storage device 114, a removable media storage device 116, and several user interface devices such as a display or computer monitor 120, a keyboard 122, and a cursor controlling device 124. Attached to the memory bus 130 are random-access memory (RAM) 132, and read-only memory (ROM) 134. The hard disk storage device 114 may include hard disk drives, or an optical drive. The removable media storage device may include a floppy, a Zip drive, or a CD Rom drive. The cursor controlling device 124 is used to move a cursor 150 on the screen of the display or computer monitor 120 and to mark certain areas of text on the screen. The cursor can also be used to issue selected commands by the user. This invention is directed to the cursor controlling device 124 used as one of the user interfaces.

It should be noted that a computer system 100 can be of any size. In other words, the computer system 100 could be a notebook computer, a laptop computer, or a portable computer. The computer system 100 could also be a desktop computer, a workstation or a mid-range, mainframe or a supercomputer. The cursor controlling device 124 can be used as a user interface or input device on any one of these types or sizes of computer.

Figure 2:
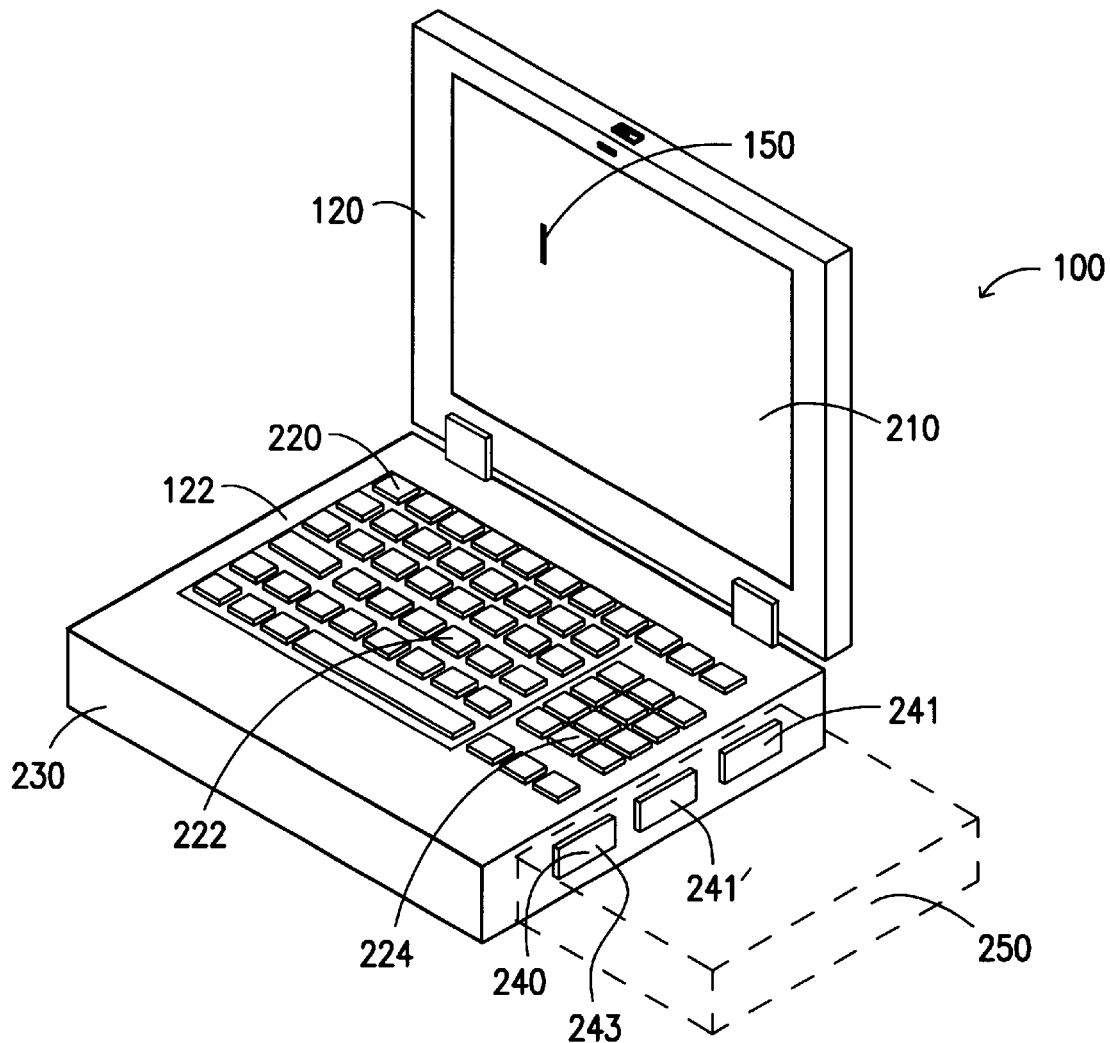
FIG. 2 is a perspective view of a first embodiment of a computer with an ultrasonic cursor controlling device.

Computer 100 is shown in perspective in FIG. 2 in the form of a laptop computer. Monitor 120 folds over the top of the keyboard 122. The monitor includes a screen 210. On the screen 210 is a cursor 150. The keyboard 122 includes function keys 220, alpha-numeric keys 222 and a numeric key pad 224. The keyboard 122 is positioned in a surface of a housing 230 of a computer 100. Also within the housing 230 is a first emitter 240. The emitter 240 emits appropriate energy, such as infrared and ultrasonic energy. A receiver 241 receives reflections of the emitted energy. One receiver 241 and one emitter 240 are shown in FIG. 2. It should be understood that more than one emitter 240 can be positioned on the housing 230 of the computer 100. The emitter 240 can include a transmitter of electromagnetic energy as well as two receivers of reflected electromagnetic energy. A field which is shown by the box 250, in broken line form, in FIG. 2 is positioned adjacent the computer 100. The field 250 is not an actual box or an actual physical box but is rather a field or field of space in which reflected energy is detected and considered as valid input for the cursor controlling device 124 (shown in FIG. 1). The position of the field 250 is selected so that it is familiar to the user. For example, the field 250 shown in FIG. 2 roughly corresponds to the field where a user's mouse or trackball would previously have been positioned. In this way, the user of the computer 100 can go back to a familiar area or field to implement the cursor controlling device 124 which includes an emitter 240. By moving a hand or fingers in certain ways through or within the field 250 and interpreting these hand movements or finger movements, the movement of the cursor 150 on the screen 210 can be controlled. Other inputs, such as marking an area of text in a word processing program, can also be accomplished. For example, the plane of the volume could be broken once and then the following finger motions could be used to mark text. Once marked, the text could be made bold or italicized by moving the cursor to a tool bar and then breaking the plane of the volume to click a particular button on a tool bar. In other words, crossing the boundaries once within a desired amount of time can be interpreted as a single click or crossing the boundaries twice within a desired amount of time can be interpreted as a double click. It should be noted that the emitter 240 can emit energy in ultrasonic and infrared bands. Furthermore, the actual boundaries of the volume can be adjusted to accommodate the particular idiosyncracies of a user.

Figure 3:
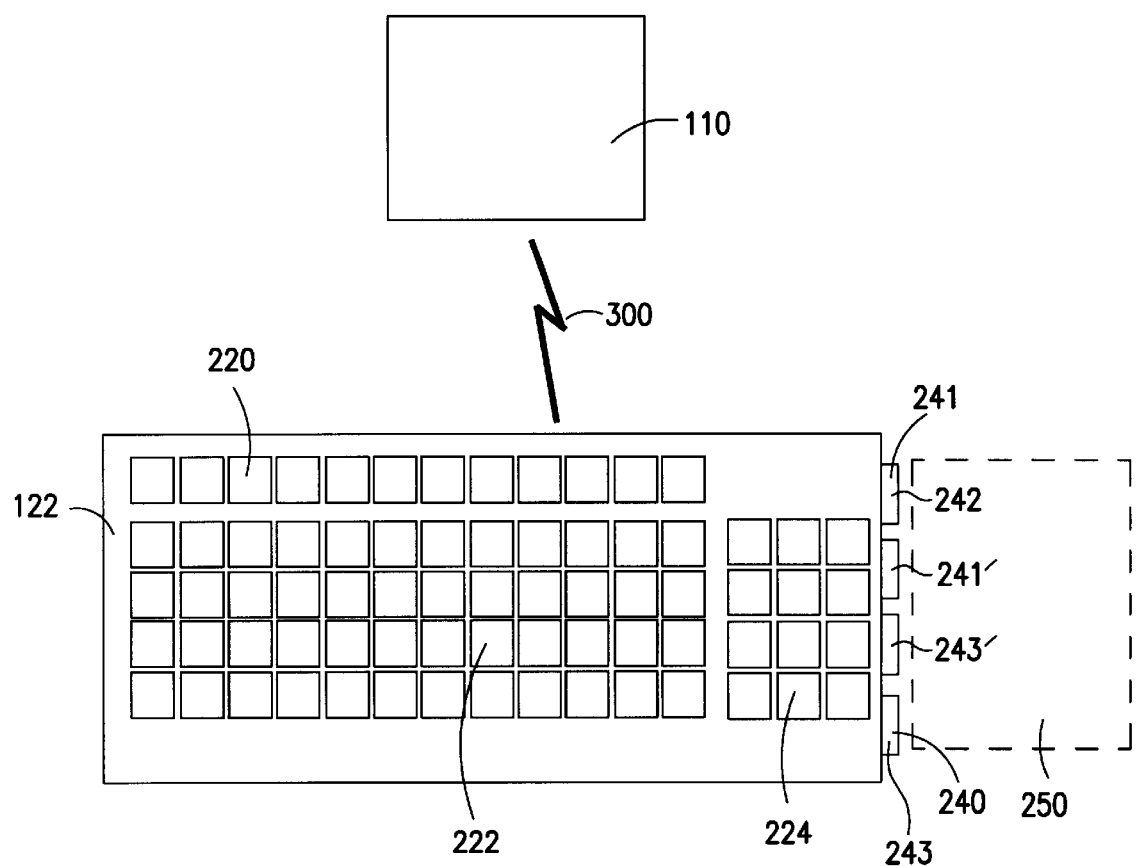
FIG. 3 is a top view of a computer keyboard with an ultrasonic cursor controlling device.

FIG. 3 shows a top view of a computer keyboard 122 which has portions of an ultrasonic cursor control device 124 as well as an infrared link to a bus 110 of a computer. This type of arrangement is commonly available in Gateway Computer's Destination system. In this particular arrangement there are two emitters 240 and 242. The two emitters transmit energy. Receivers 241, 241', 243 and 243' receive reflected energy. A field 250 is selected adjacent or near the computer keyboard 122. The field 250 is selected so that it is familiar to the user. In this particular instance, the field 250 replaces a mouse. Advantageously there is no cabling or bulky equipment or mouse pad required in order to input commands to the computer. A further advantage is that the input can be operated single handedly. In other words, there is no need for one had to hold down a switch to enable a switch so that hand motions can be used as inputs. The cursor control device 124 can be also thought of as a virtual mouse or virtual input device.

Figure 4:
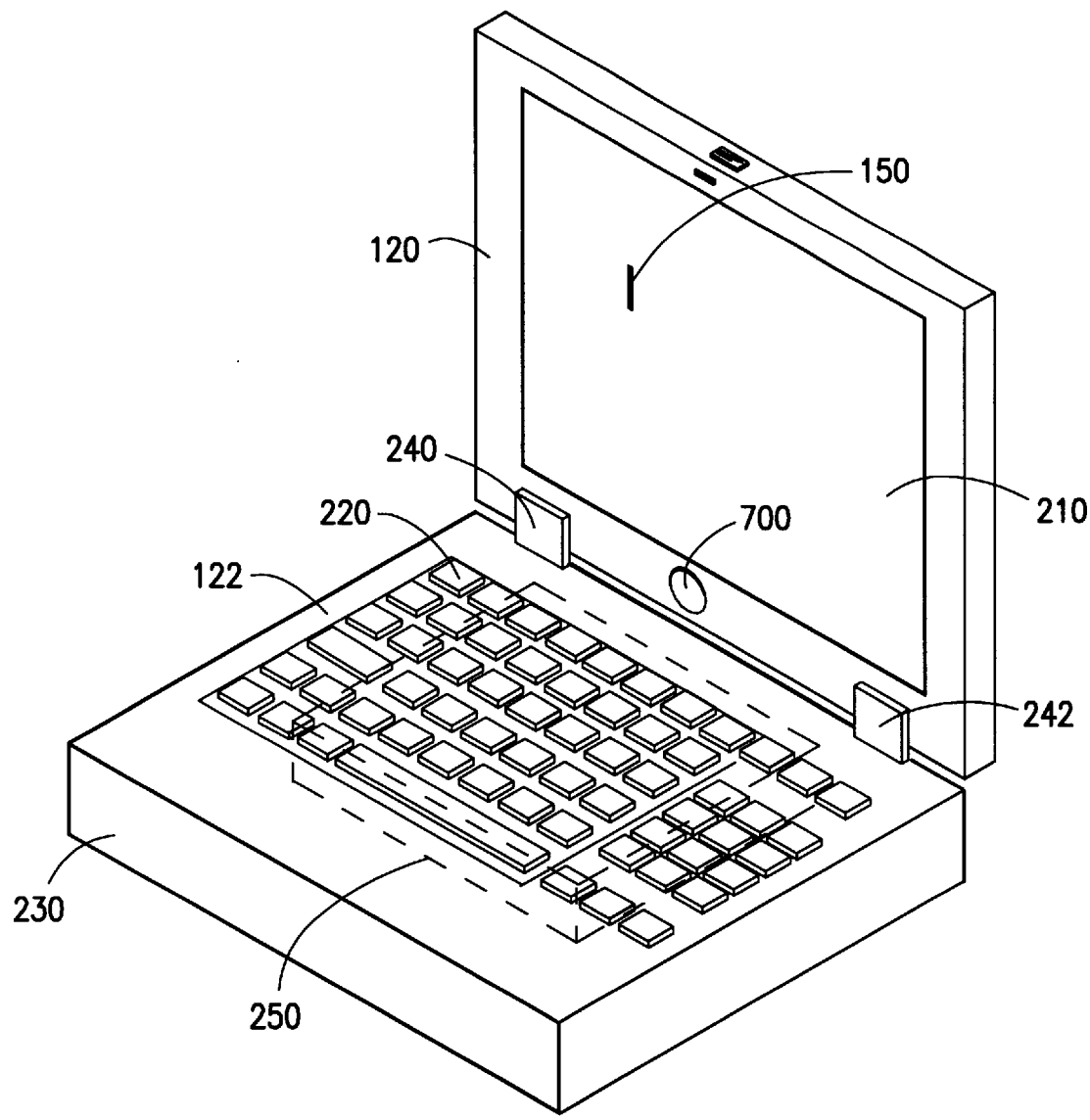
FIG. 4 is a top view of a third embodiment of a computer with an ultrasonic cursor controlling device.

FIG. 4 is a top view of another notebook computer 100. The notebook computer includes a monitor 120 having a screen 210. On the screen 210 is a cursor 150. A keyboard 122 is positioned in front of the monitor. A pair of emitters 240 and 242 is attached to the monitor 120. The field 250 is placed over the top of the keyboard 122. Again, the field 250 is placed in an area that is convenient for the user. In this particular instance, the field 250 is placed over the keyboard 122. In this particular model, the user may have been used to stick points, a trackball built into the keyboard, or a touch pad built into the keyboard. The field 250 can be moved to selected areas such that the user can go back to a familiar field or space with respect to the keyboard for using motions to control the movement of the cursor 150 on the screen 210. The commands and more specifically the finger motions can be programmed so that the user can use familiar motions to move the cursor and provide other input to the computer system. For example, if two people use a particular computer, one user could configure the computer so that the finger motions correspond to a short joystick placed in the center of the keyboard. The first user may place this in a user profile. The profile would include defining the input volume over the keyboard just above the middle keys (t,y,f,g,h,j,b, and n). A second user who is most familiar with using a touch pad, would enter a profile where different hand and finger motions would be used. The input volume would also be positioned over an area below the bottom row of keys on the keyboard. It is also worthy to note, that more than one input space could be defined. For example, the space bar on a computer could also be eliminated by defining an input area where the space bar previously was. When a users thumb enter the area, a space would be placed on the screen.

The computer 100 shown in FIG. 4 is a notebook or laptop computer similar to the one shown in FIG. 2. The computer 100 shown in FIG. 4 includes a monitor 120 that folds over the top of the keyboard 122. The monitor includes a screen 210. On the screen 210 is a cursor 150. The keyboard 122 includes function keys 220, alpha-numeric keys 222 and a numeric keypad 224. The keyboard 122 is positioned in a surface of a housing 230 of the computer 100. Also within the housing 230 is a transmitter 700. The electromagnetic transmitter 700 emits energy. Two receivers transducers 241 and 241' are shown in FIG. 2. The receivers 241 and 243 receive reflected electromagnetic energy from the field 250. It should be understood that more than two receivers can be positioned on the housing 230 of the computer 100. A field which is shown by the area 250 in FIG. 4 is positioned adjacent the computer 100. The field 250 is not an actual box or an actual physical box but is rather an area or field of space in which reflected energy will be considered as valid input for the cursor controlling device 124 (shown in FIG. 1).

The position of the field 250 is selected so that it is familiar to the user. For example, the field 250 shown in FIG. 4 roughly corresponds to the field where a user's trackball would previously have been positioned. The field 250 is placed over the top of the keyboard 122. Again, the field 250 is placed in an area that's convenient for the user. In this particular instance, the field 250 is placed over the keyboard 122. In this particular model the user may have been previously used to track points, a trackball built into the keyboard or a touch pad built into the keyboard. The field 250 can be moved to selected areas such that the user can go back to a familiar field or space with respect to the keyboard for using motions to control the movement of the cursor 150 on the screen 210. The field 250 is generally adjacent or near the computer keyboard 122, whether the computer is a portable notebook, notebook or desktop type computer.

Advantageously, the user of the computer 100 can go back to a familiar area or field to implement the cursor controlling device 124 which includes an emitter 240. This is especially useful if the user has another personal computer that he or she is used to. By moving a hand or fingers in certain ways through or within the field 250 and interpreting these hand movements or finger movements, the movement of the cursor 150 on the screen 210 can be controlled. It should be noted that the electromagnetic transducer 240 can emit any kind of electromagnetic radiation and receive the same electromagnetic radiation in reflected form.

Figure 5:
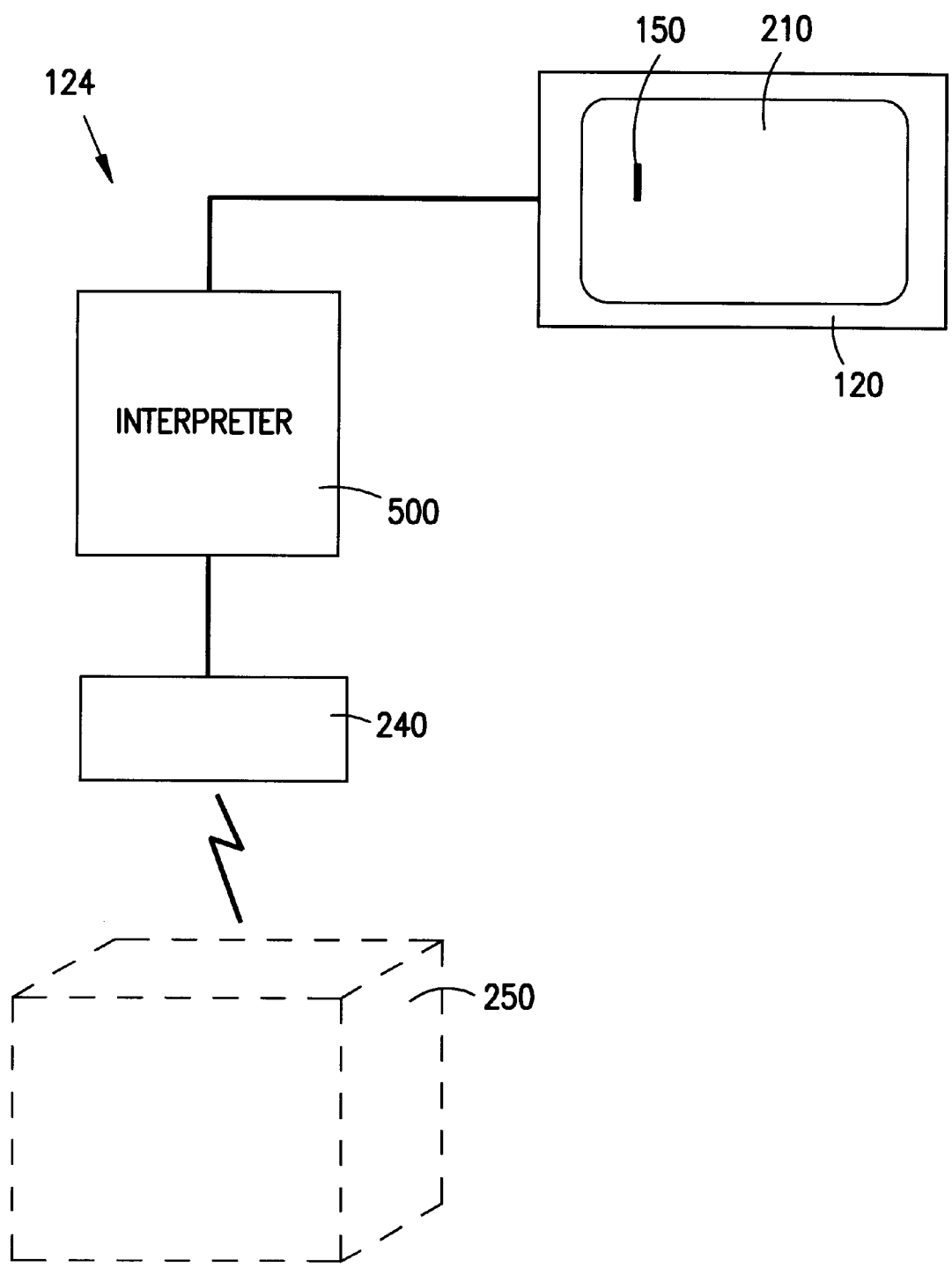
FIG. 5 is a schematic view of the cursor controlling device of the computer.

FIG. 5 is a block diagram or view of the cursor controlling device 124 of the computer 100. The heart of the cursor controlling device 124 is an interpreter 500. The interpreter 500 is a software or hardware device or a combination hardware and software device which uses the reflected electromagnetic energy from the transducer 240 to define movements within the field 250. The interpreter maps certain movements within or through the field 250 to control the movement of the cursor 150 on the screen 210 of the monitor 120 of the computer 100. The interpreter 500 limits the space or limits the field through which motions can be made for interpretive purposes. The field can be moved by reprogramming the position or boundaries of the field 250. For example, the interpreter can be reprogrammed to move the box to any desired position within the physical range of the transducer output. The valid field needs only to be defined. The interpreter may be reprogrammable by a user. If so, the reprogrammability may limit the user to one of a plurality of fixed choices. The interpreter may limit the field 250 by taking reflections from only within a field having various coordinates. The interpreter 500 also maps or considers movements within the input space, or field 250, as valid inputs. Other inputs can be identified and ignored as noise. The interpreter 500 also maps certain movements to certain inputs for controlling the cursor 150. For example, moving a finger in the "x" axis of FIG. 2 would be interpreted on the display as cursor movement to the right. Similarly, moving a finger in the "y" axis would cause the controller to interpret the movement and display it on the screen as a movement up. Table 1 below shows an example of such a movement and associated input commands. The interpreter can also be used to increase the sensitivity of finger movements within the space 250. For example, if only slight finger movements are required or desired to be used in interpreting or in controlling the cursor 150, the sensitivity can be controlled by the interpreter 500. It is also contemplated that the interpreter 500 could be manipulated to move the space to other desired locations adjacent or near the computer keyboard or another familiar area where other cursor control devices have previously been used by the user. It is further contemplated that the movements can be changed or added for new or particular input commands.

TABLE 1

Interpreter Mapping Table

| MOVEMENT | INPUT | |
|---|---|---|
| Passing through the space | Mouse click | (z) |
| Passing through the space twice within a timed spacing | Double mouse click | (z) |
| Movement up | Cursor movement up | (+y) |
| Movement down | Cursor movement down | (−y) |
| Movement left | Cursor movement left | (−x) |
| Movement right | Cursor movement right | (+x) |

Movements within or through the input space can be used to define a first set of commands and a second set of commands. For example, the first two commands listed above dealing with mouse clicks could be a first set of commands. It should be noted that breaking the boundary of the space could be interpreted as a single mouse click and breaking the boundary of the space twice within a timed spacing could be interpreted as a double mouse click. The remaining four commands listed above dealing with cursor movement could be a second set of commands.

Defining a space affords advantages for the cursor controlling device 124. For example, signals or movements outside the space 250 will not be interpreted and therefore there will be no noise from other areas. In addition, by defining a space that is familiar to the region, the designer can place the virtual mouse in a defacto region where a mouse usually is.

It should be understood that the interpreter 500 can be a computer hardware or software device. The computer interpreter 500 could also be a combination of both computer hardware and computer software. The advantage of including software on the interpreter 500 is that certain parameters such as the sensitivity, the end points of the field 250, as well as the movements can be programmed and easily changed by editing a parameter list directly or by commands. Thus, a software implementation affords the user flexibility. Also noteworthy is that the space or input volume 250 can be subdivided. For example, a portion of the volume or space 250 can be devoted to producing spaces on the screen. In other words, the volume or space can be substituted for a space bar on the keyboard.

Figure 6:
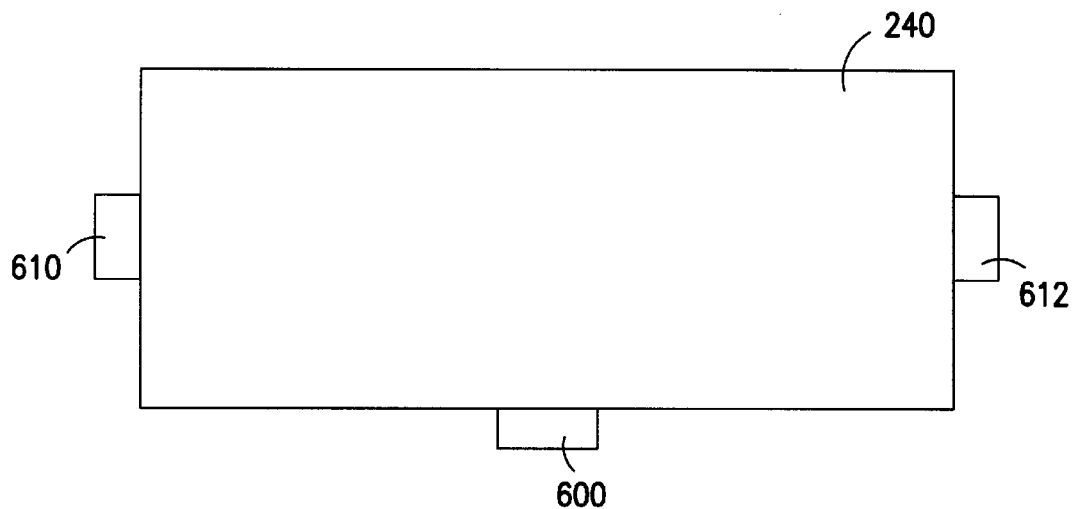
FIG. 6 is a schematic view of a first embodiment of a transducer for the cursor controlling device.

FIG. 6 shows one embodiment of an emitter 240. The directional emitter 240 includes an ultrasonic transmitter 600 and a first ultrasonic receiver 610 and a second ultrasonic receiver 612. The ultrasonic transmitter 600 produces pulses of ultrasound. The short wave length of the ultrasound is beyond the range of human hearing and also enables a computer to produce a more detailed image. The ultrasound is also more easily directed towards a specific field or area 250 adjacent the computer. When a finger or other object is in the area 250, a reflection from the object is received at one or both of the receivers of the ultrasound, 610 and 612. The difference between the times the reflections are received can be used to determine the distance of the reflected object from the receivers, 610 and 612. This in turn can be used to produce a position signal for the finger. As various pulses are produced, movement of a finger or other object through the field 250 can be followed and calibrated. The result is a map of the motion that can be used by the interpreter 500 to determine the various motions and commands for the cursor 150 on the monitor 120.

Figure 7:
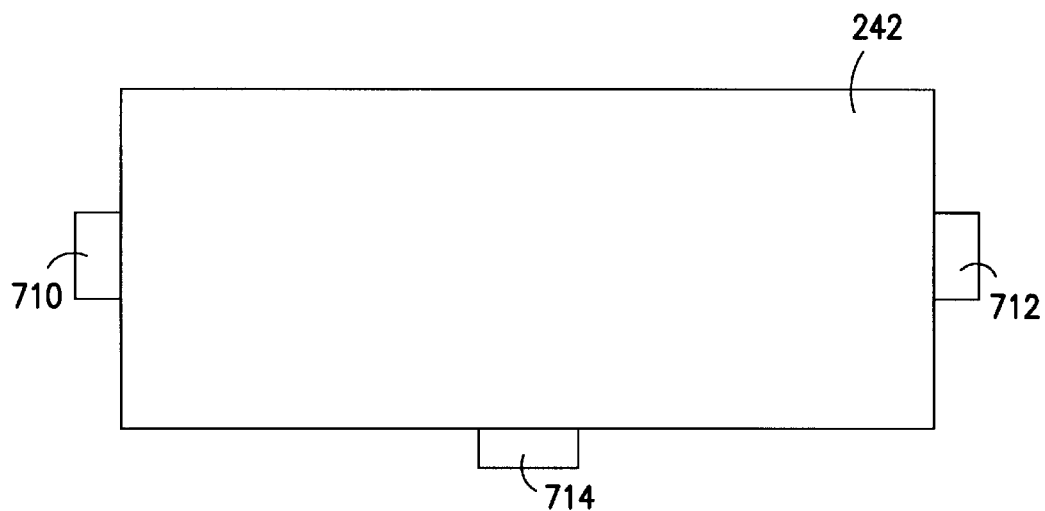
FIG. 7 is a schematic view of a second embodiment of a transducer for the cursor controlling device.

FIG. 7 shows a second embodiment of the emitter 242. The second embodiment of the emitter is used with an omni-directional, ultrasonic transmitter 700 as shown in FIG. 4. The emitter 242 includes only receivers of ultrasonic sound. As shown in FIG. 7, the emitter 242 includes receivers 710, 712 and 714. In operation, the omni-directional ultrasonic transducer 700 produces pulses of energy. The reflected ultrasonic energy is received at the receivers 710, 712 and 714. Typically two of these transducers are used with an omni-directional ultrasonic transmitter 700. It should be noted that there are applications where one transducer 242 may be used in conjunction with an omni-directional ultrasonic transmitter.

Figure 8:
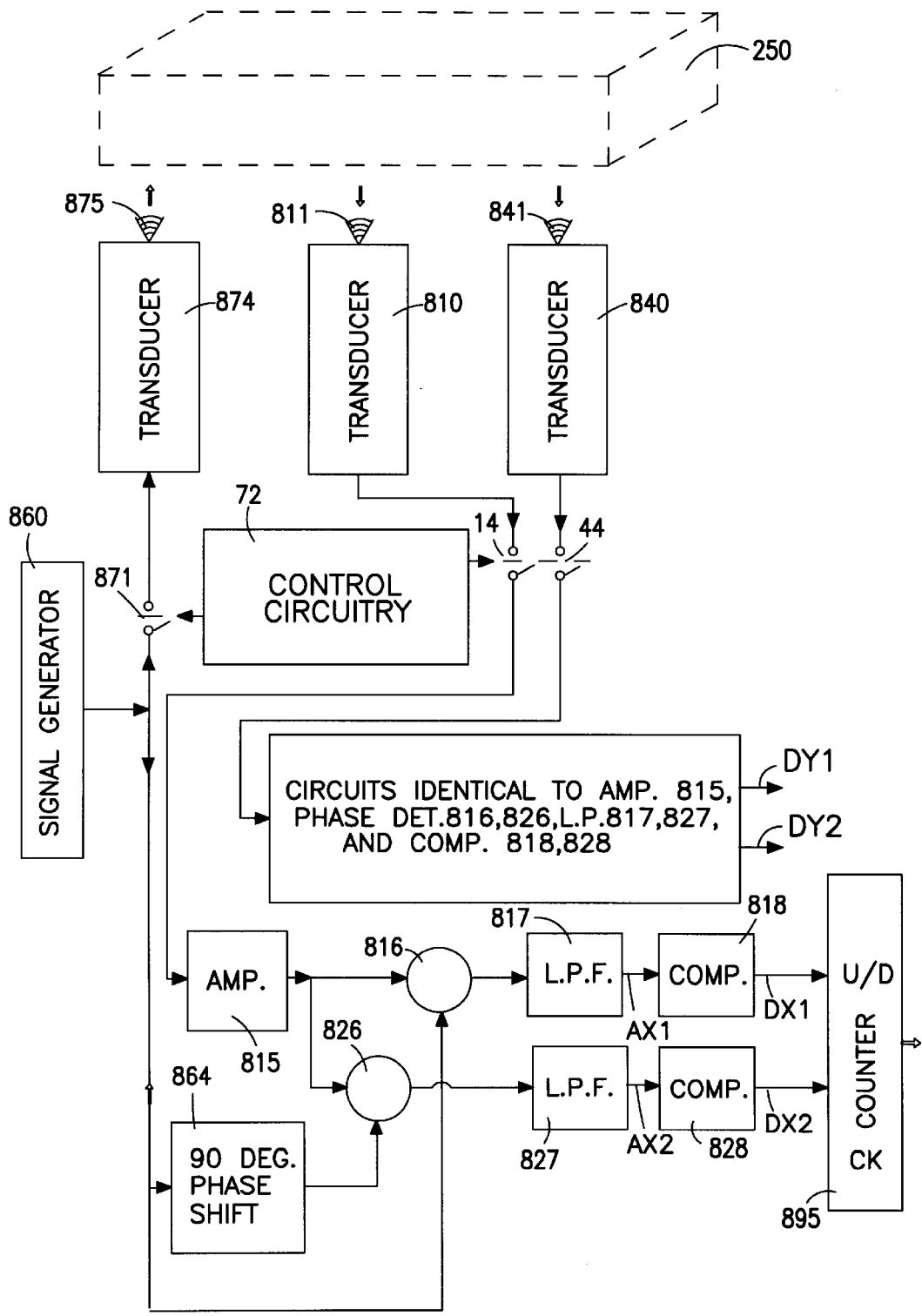
FIG. 8 is a schematic view of an electrical circuit used for ultrasonic range detection for use as part of the cursor controlling device.

FIG. 8 shows a set of electronics used for ultrasonic range finding. An ultrasonic range finding system 800 includes a pulse generator 860, a transmitter 811, timing counters 895 and a receiver 841, 875. The time from the emission of a pulse to its return after reflection by an object is proportional to the distance to the object.

FIG. 8 describes the electrical structure of an embodiment of the invention, using multiple receivers to measure the velocity and displacement. Measuring the phase of sent and received pulses is one method for determining time and distance from the object.

Once the range from two different angles is known, the position, and direction and rate of movement may be easily calculated by software in interpreter 500. Only measurement in one dimension is detailed, the second dimension uses identical circuits. An ultrasonic frequency signal generator 860 is connected to a transmitter 874 to transmit ultrasonic waves as represented by pattern 875. The waves are reflected off a surface such as a word or finger. The reflected waves are converted by the receiver 810A to electrical signals, which are transferred through switch 814 to a pair of phase detectors 816 and 826, where detection of the reflected waves takes place.

Time switching is used to isolate between transmitter 874 and receiver 810 and to receive only from a designated range. The receiver is turned on only after the termination of the transmitted pulse. A control circuit 872 generates a first pulse train which controls a switch 871, thus switching on and off the AC signal to transducer 874, which transmits an interrupted ultrasonic wave. The switching frequency is two or more times the maximum expected Doppler frequency, so as not to interfere with the measuring process, because of Nyquist's limit.

Control circuit 872 also generates a second pulse train, delayed relative to the first pulse train, which controls a switch 814, thus switching on the received signal only for a short period, at a fixed delay from the transmitted pulse, and thus generating the range-gated received signal. This signal is amplified as needed in the amplifier 815.

The phase of this signal is measured using a phase detector comprising a mixer 816 and a mixer 826, and using first and second reference signals. The first reference signal is the output of a generator 860, and it is connected to the mixer 816; the second reference signal is the output of the generator 860, after being delayed a 90-degree phase shift in a unit 864, to deliver a phase-shifted reference to the second phase detector 826. The resulting signals at mixers 816 and 826 outputs, contain the needed result, but also unwanted signals at the switching frequency, sum frequency and various harmonics. A low Pass Filter 817 and a low pass filter 827 have a band pass range to include the maximum expected Doppler frequency, but to exclude (to stop) the unwanted signals at the switching frequency, harmonics, etc.

The resulting two-phase difference signals AX1 and AX2 give unambiguously the displacement in the direction of the transmit and receive paths because of the Doppler effect. A constant movement of the sensor results in an ever increasing phase, possibly many times 360 degrees. To correctly measure the displacement, the correct phase must be measured, taking into account the phase overflow every 360 degrees. Comparators 818 and 828, having a fixed threshold preferably of zero volts, convert the two-phase differences AX1 and AX2 into digital signals-negative phase results in one digital level, and positive phase results in the other digital level.

Figure 9:
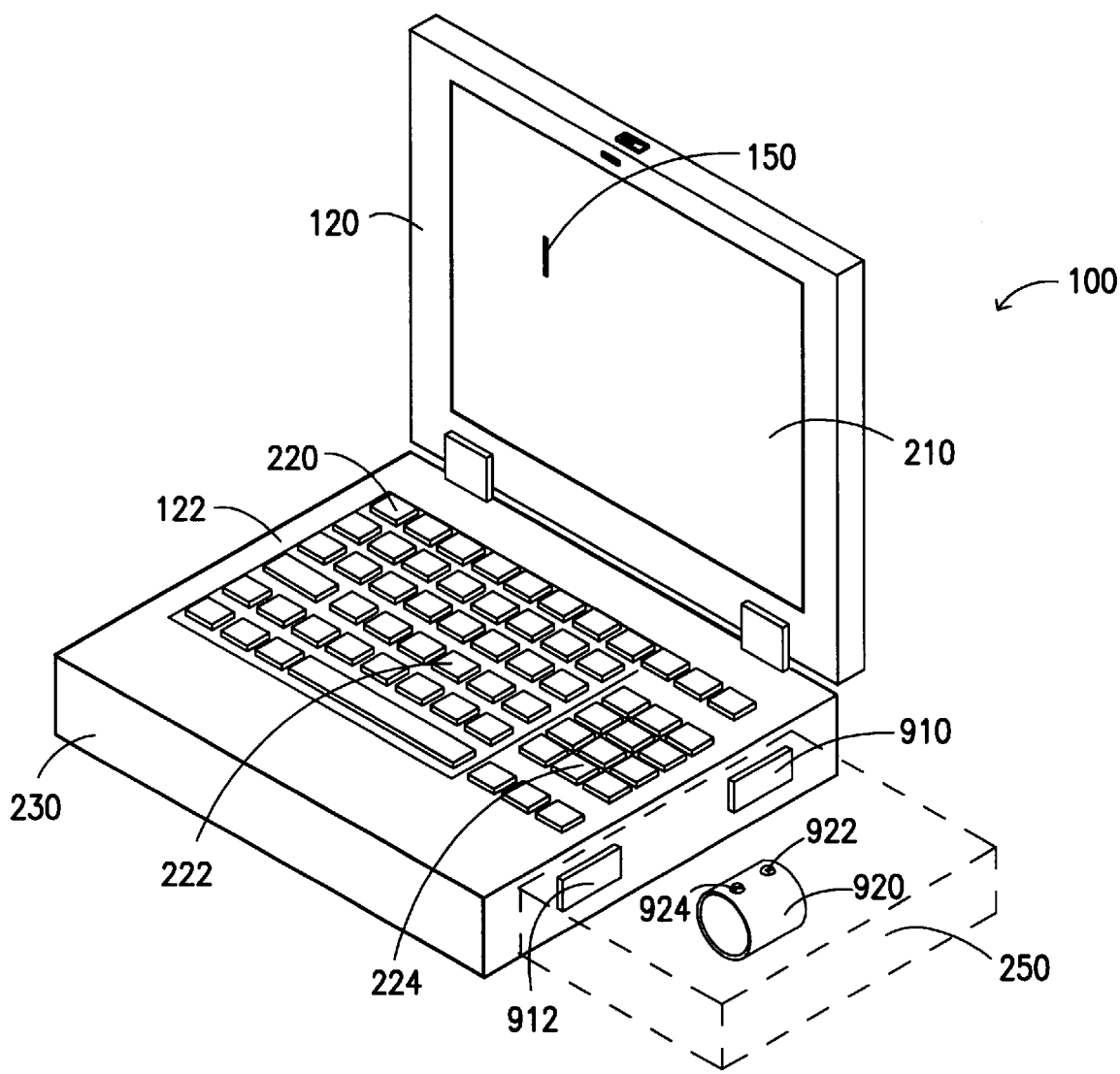
FIG. 9 is a schematic view of an embodiment of the cursor controlling device for a computer which uses an infrared detector.

It should be noted that it is not necessary to use an ultrasonic source and detectors in order to practice this invention. Infrared detectors can also be used in place of the ultrasonic transmitter and ultrasonic detector or receiver. FIG. 9 shows another embodiment of an input device used to control a cursor 150 on a monitor. Light sensors 910 and 912 are attached to the housing of a computer or some other fixed base. A finger cot 920 includes a series of light-emitting diodes 922 and 924. By moving the finger cot within a field 250 adjacent the computer, the light sensors 910 and 912 detect the motion within the field 250. The motions can be detected and interpreted as described in the above embodiments. The light sensors shown can be within any band of light. Preferably, however, the light sensors and the LED will work within an infrared spectrum of electromagnetic energy.

Figure 10:
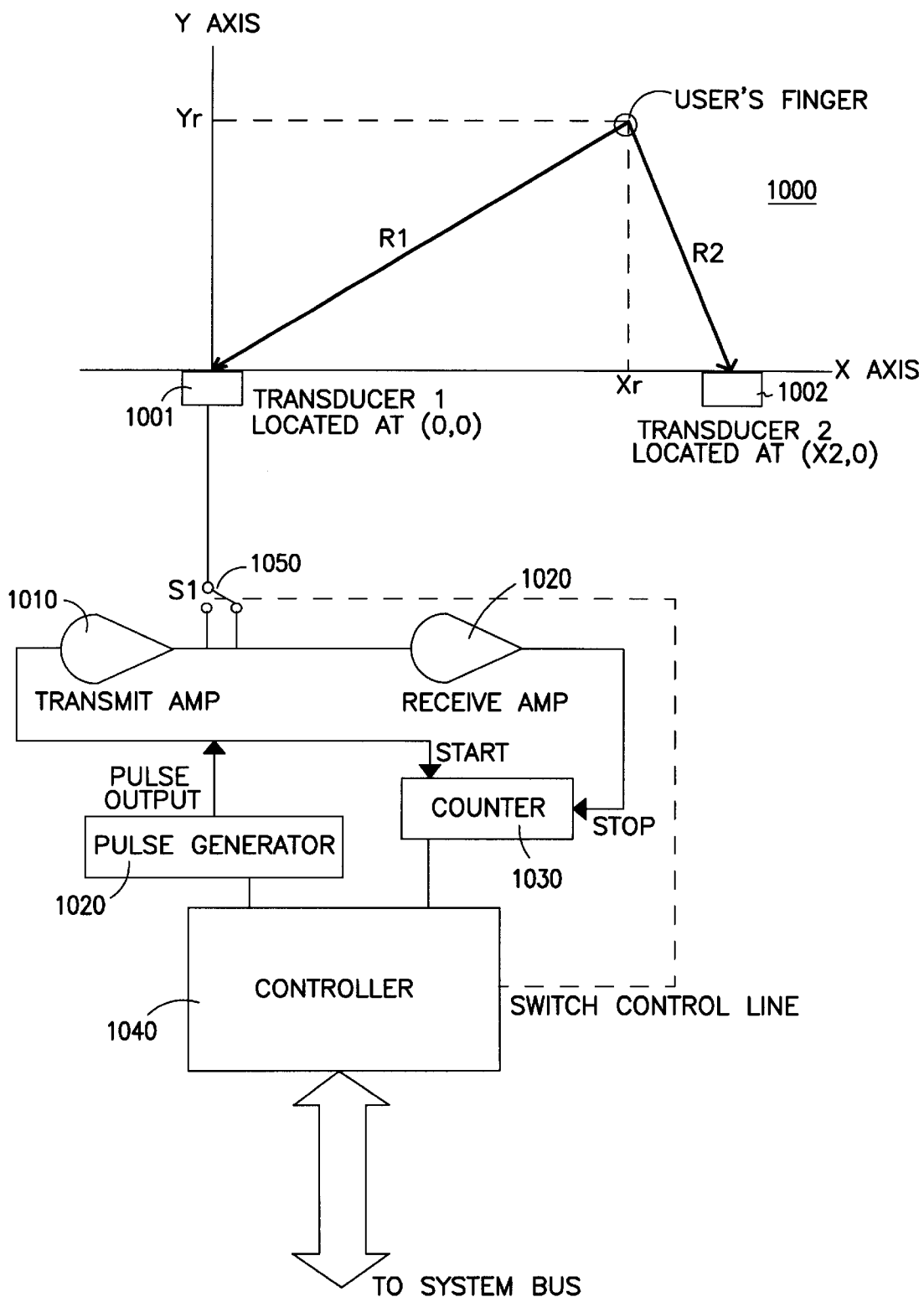
FIG. 10 is a block diagram of another preferred embodiment of this invention.

FIG. 10 shows a block diagram of another preferred embodiment of the invention. A field 1000 is defined by an "x" axis and a "y" axis. The user moves a finger in the field to move the cursor on the monitor of the computer system. Positioned near the field are a first sensor 1001 and a second sensor 1002. Each of the first sensor 1001 and the second sensor 1002 includes an emitter and a receiver. The sensors 1001 and 1002 are similar to those used in cameras and wireless tape measures. Such sensors 1001 and 1002 are available as catalogue number 270-1002 from Digi-key, Inc. of Thief River, Falls, Minn.

Electrically connected to the first sensor 1001 are a transmit amplifier 1010, a receiver amplifier 1012, a pulse generator 1020, a counter 1030 and a controller 1040.

A switch 1050, which is under the control of controller 1040, switches between an emit mode wherein transmit amplifier 1012 is attached to the sensor 1001, and a receive mode where the receive amplifier 1020 is attached to the sensor 1001. As shown in FIG. 10, the system is in a receive mode. A duplicate circuit is attached to sensor 1002. The controller 1040 controls the circuitry attached to sensor 1002 and therefore controls the duplicate counter (not shown) and duplicate transmit and receive modes associated with sensor 1002.

In operation, the controller sets switch 1050 to the transmit amplifier 1012. The controller 1040 then commands the pulse generator 1020 to produce the desired ultrasonic (or IR) pulse. This pulse also starts the counter 1030 counting clock pulses.

After waiting a predetermined time for ringing to die down, the controller 1040 sets the switch 1050 to the receive amplifier 1012. The return echo is amplified by the receive amplifier 1012 and is used to stop the counter 1030.

The distance to the target (user's finger) is designated as R1 in the field 1000 and can be found by using the following equations:

$$R_1 = (V \cdot T/2)$$

where

V=the speed of sound and

T=the round trip time to the target.

For our purposes, the speed of sound can be considered a constant since it will be the same for both sensor 1001 and sensor 1002. The same process is performed for sensor 1002 to obtain $R_2$.

It is now known that the target lies on the intersection of the two circles defined by $R_1$ and $R_2$. Of course, there are two possible solution points. One of the possible solutions can be discarded since the target is not located inside the computer. The following simultaneous equations define the target location:

$$(R_1)^2 = X_r^2 + Y_R^2$$

$$(R_2)^2 = (X_2 - X_r)^2 + Y_r^2$$

Since both $R_1$ and $R_2$ have been measured and $X_2$ is a design parameter, the values for $X_r$ and $Y_r$ can be determined. This defines the position of the target at one point in time. Comparing the target's position at sequential points in time allows the system to track the target's motion. The patterns generated can be used to determine the desired position of the cursor.

Figure 11:
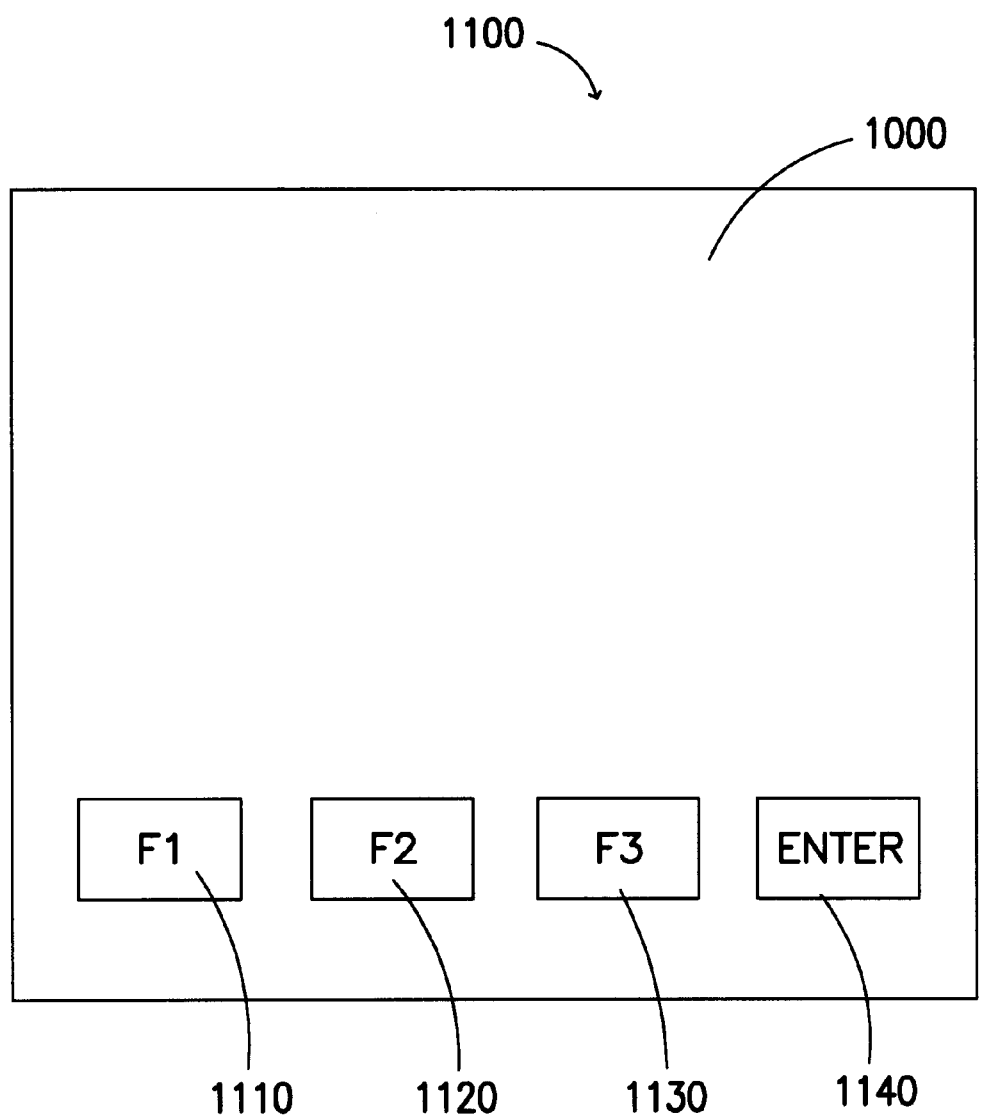
FIG. 11 is a top view of a template for use with this invention.

FIG. 11 shows a template 1100 which includes virtual mouse function buttons 1110, 1120, 1130 and 1140. The template 1100 can be printed out and positioned within the field 1000. For example, the printed out template could be laid on a desktop and provide function buttons 1110, 1120, 1130 and 1140. The software would have the capability to generate different functions on buttons 1110, 1120, 1130 and 1140. The template could also include a positioning method to assure that the template 1100 is properly positioned. For example, the template could be attached to a desk, then the computer could ask the user to "tap" button 1110 and button 1140. These taps could be then used to set the field 1100. It should be noted that the "x" and "y" axes of the field 1100 are relative references and can be easily transposed to the appropriate cursor coordinates.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. An input device for a computer comprising:

a transmitter for producing energy;

a first directional receiver for receiving reflected energy from at least one selected field in space defining a volume having an adjustable boundary;

a second directional receiver for receiving reflected energy from said at least one selected field in space;

a clock for determining the difference in time between producing a first amount of energy from the transmitter and receiving the first reflected energy from the transmitter at the first directional receiver and receiving the first reflected energy from the transmitter at the second directional receiver, the clock also determining the difference in time between producing the wave from the transmitter and receiving the second reflected wave front from the transmitter at the first directional receiver and receiving the second reflected wave front from the transmitter at the second directional receiver;

a comparator for determining the difference in time between producing the first wave front at the transmitter and receiving the first reflected wave front at the first receiver, and producing the second wave front at the transmitter and receiving the second reflected wave front at the first receiver;

an interpreter for detecting movements within the at least one selected field and mapping the detected movements to control inputs to the computer which include cursor movement on a computer monitor; and at least one input space defined by the at least one selected field and movable to any desired position within the physical range of the transmitter.

2. The input device of claim 1 wherein the transmitter produces ultrasonic energy.

3. The input device of claim 2 wherein the first directional receiver and the second directional receiver receive reflected ultrasonic energy from the at least one selected field in space.

4. The input device of claim 1 wherein the transmitter produces infrared light energy.

5. The input device of claim 1 wherein the reflected energy is reflected from a selected field positioned at a distance from said first and second receivers.

6. An input device for a computer comprising:

a transmitter for producing energy;

a first directional receiver for receiving reflected energy from a selected field in space;

a second directional receiver for receiving reflected energy from the selected field;

a clock for determining the difference in time between producing a first amount of electromagnetic energy from the transmitter and receiving the first reflected energy from the transmitter at the first directional receiver and receiving the first reflected electromagnetic energy from the transmitter at the second directional receiver, the clock also determining the difference in time between producing the wave from the transmitter and receiving the second reflected wave front from the transmitter at the first directional receiver and receiving the second reflected wave front from the transmitter at the second directional receiver;

a comparator for determining the difference in time between producing the first wave front at the transmitter and receiving the first reflected wave front at the first receiver, and producing the second wave front at the transmitter and receiving the second reflected wave front at the first receiver; and an interpreter for detecting movements within the selected field and mapping the detected movements to control inputs to a computer which include cursor movement on a computer monitor.

7. The input device of claim 3 wherein the first directional receiver comprises two ultrasonic receivers, and the second directional receiver comprises two ultrasonic receivers.

8. The input device of claim 3 wherein the first directional receiver comprises two ultrasonic receivers, and the transmitter for producing energy is positioned near the two ultrasonic receivers of the first directional receiver.

9. The input device of claim 1 wherein the device is used with a computer keyboard and wherein the input space is positioned over the keys of the keyboard.

10. The input device of claim 1 wherein the device is used with a computer keyboard and wherein the input space is positioned beside the keyboard.

11. The input device of claim 1 wherein the device enables the input space so that an operator can input commands to the computer using one hand.

12. A computer comprising:

a processing unit;

a bus communicatively coupled to the processing unit;

memory communicatively coupled to the bus;

an input device communicatively coupled to said bus, said input device further comprising:

a transmitter for producing energy to a volume;

a first receiver for reflected energy from the volume;

a second receiver for reflected energy from the volume, said processing unit being programmed to define at least one selected input area from the volume, the at least one input area having an adjustable boundary and being movable to any desired position within the physical range of the transmitter, said processing unit also being programmed to map movements within the at least one selected input area to input commands;

a clock for determining the difference in time between producing a first amount of energy from the transmitter and receiving the first reflected energy from the transmitter at the first receiver and receiving the first reflected energy from the transmitter at the second receiver, the clock also determining the difference in time between producing the wave from the transmitter and receiving the second reflected wave front from the transmitter at the first receiver and receiving the second reflected wave front from the transmitter at the second receiver;

a comparator for determining the difference in time between producing the first wave front at the transmitter and receiving the first reflected wave front at the first receiver, and producing the second wave front at the transmitter and receiving the second reflected wave front at the first receiver; and an interpreter for detecting movements within the input area and mapping the detected movements to control inputs to the computer which include cursor movement on a computer monitor.

13. The computer of claim 12 further comprising a computer monitor screen having a cursor thereon, said input device for controlling the marking areas on the computer monitor screen.

14. The computer of claim 13 further comprising a keyboard communicatively coupled to said bus, said input device defining an input area adjacent the keyboard.

15. The computer of claim 13 further comprising a keyboard communicatively coupled to said bus, said input device defining an input area proximate the keys of the keyboard.

16. The computer of claim 12 further comprising a keyboard communicatively coupled to said bus, said input device attached to the keyboard and defining an input area proximate the keyboard.

17. A method for inputting data to a computer, said computer including a computer keyboard and a computer monitor, said method comprising the steps of:

defining at least one input space proximate a computer keyboard, the at least one input space having an adjustable boundary and being movable to any desired position proximate the computer keyboard;

providing an input device for the computer, the input device comprising:

a transmitter for producing energy;

a first directional receiver for receiving reflected energy from the input space;

a second directional receiver for receiving reflected energy from the input space;

a clock for determining the difference in time between producing a first amount of energy from the transmitter and receiving the first reflected energy form the transmitter at the first directional receiver and receiving the first reflected energy from the transmitter at the second directional receiver, the clock also determining the difference in time between producing the wave from the transmitter and receiving the second reflected wave front from the transmitter at the first directional receiver and receiving the second reflected wave front from the transmitter at the second directional receiver;

a comparator for determining the difference in time between producing the first wave front at the transmitter and receiving the first reflected wave front at the first receiver, and producing the second wave front at the transmitter and receiving the second reflected wave front at the first receiver; and an interpreter for detecting movements within the selected field and mapping the detected movements to control inputs to a computer which include cursor movement on a computer monitor;

detecting movement within the input space;

mapping particular movements within the space as inputs to the computer; and mapping particular movements across the boundaries of the input space as inputs to the computer.

18. The method for inputting data of claim 16 wherein the defined input space is adjacent the computer keyboard.

19. The method for inputting data of claim 18 wherein the defined space is over the keys of the computer keyboard.

20. The method for inputting data of claim 18 wherein the defined space is adjacent the short side of the computer keyboard.

21. The method for inputting data of claim 18 further comprising the step of mounting a transducer for detecting movement onto the computer keyboard.

22. The input device of claim 1 further comprising a plurality of input spaces movable to any desired position within the physical range of the transmitter.

23. The input device of claim 1 wherein the transmitter comprises a finger cot including at least one light emitting diode.

24. The input device of claim 1 further comprising a second input space having an adjustable boundary, the second input space defined by a second selected field in space movable to any desired position within the physical range of the transmitter.

* * * * *